Jan. 2, 1951   J. B. WHITLOW   2,536,337
STABILIZER FOR AUTOMOBILE FRAMES
Filed June 30, 1948
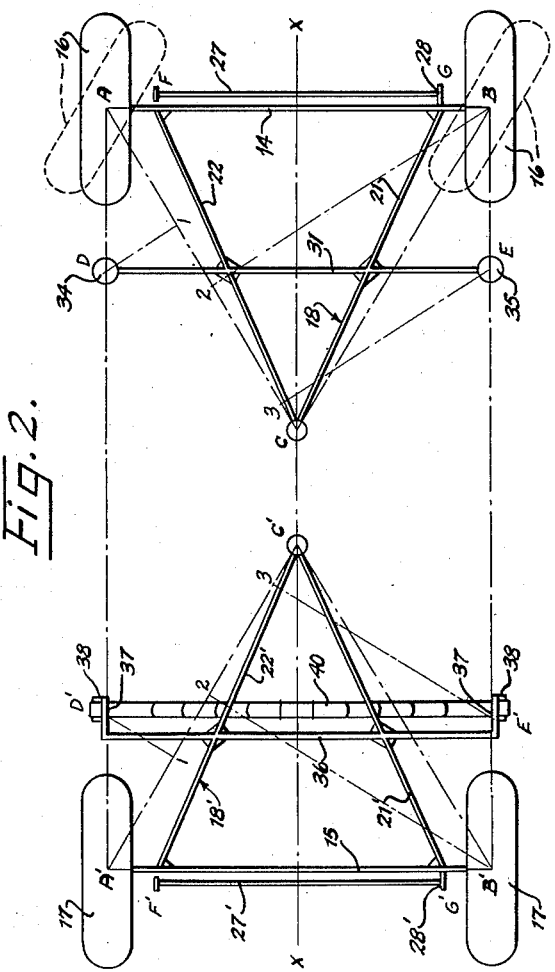
INVENTOR.
John B. Whitlow
BY
Munn, Liddy, Slocum & Rich
Attys.

Patented Jan. 2, 1951

2,536,337

UNITED STATES PATENT OFFICE 2,536,337

STABILIZER FOR AUTOMOBILE FRAMES

John B. Whitlow, Maysville, Ky.

Application June 30, 1948, Serial No. 36,155

3 Claims. (Cl. 280—124)

This invention relates to spring suspensions of the type especially adapted for use in connection with automotive vehicles.

An important object of the present invention is to provide a generally improved suspension of the type above mentioned which is simple in construction, inexpensive to manufacture and of such character that it may be economically maintained at a high state of efficiency in the performance of its intended functions.

To the above and other ends, the invention contemplates, for use in an automobile chassis of the type including a frame, an axle and a pair of road wheels carried by said axle; a stabilizing unit comprising a pair of radius rods, connected at their diverging ends to said axle and suitably connected, for universal movement, at their converging ends to said frame at a point located in a central vertical plane passing longitudinally through said frame, said stabilizing unit being in cooperative association with a pair of compression springs adapted to act upwardly on said frame and downwardly on said rods at points intermediate their ends and being arranged in transversely off-set positions with relation to said rods and, at least in part, occupying positions within, or substantially within, planes disposed in a parallel relation to the first mentioned plane and passing respectively through said wheels at their theoretical points of contact with the road surface.

Other objects and advantages of the invention will become apparent from the following description when taken in connection with the accompanying drawings, in which:

Figure 1 is a side elevation of an automobile chassis embodying the present invention, and Figure 2 is a schematic view illustrating the relationship existing between various elements of the invention as they would appear in place.

As will be understood from the drawings, the chassis herein shown as embodying the present invention includes a frame 10, comprising the usual side members 11 and 12, the former of which is broken away in order that the latter may appear, at least in part. The chassis 10 is equipped respectively with suitable front and rear axles 14 and 15, which, as will be readily appreciated, may be of any appropriate design.

Since the details entering into the construction of the axles 14 and 15 are without significance, insofar as the present invention is concerned, it is deemed sufficient to only generally illustrate them, as in Figure 1, and to schematically indicate them, as in Figure 2. At the outer ends of the front axle 14, are provided the usual front road wheels 16, which, as will be appreciated, are adapted to be moved, by suitable steering mechanism not shown, from one steering position to another. The rear axle 15 is provided at its outer ends with the customary rear or traction wheels 17, which maintain a parallel relation to the central vertical plane of the chassis 10 and are adapted to be driven through the medium of a power plant, not shown, in accordance with usual practice.

The suspension herein illustrated as an embodiment of the present invention comprises a pair of stabilizing units 18 and 18' in cooperative association with the respective axles 14 and 15. The unit 18 includes a pair of radius rods 21, 22, which at their forward or diverging ends are suitably connected to the axle 14 at points relatively near the front wheels 16. The rear or converging ends of the radius rods 21, 22 where joined to each other, are suitably connected for universal movement to the frame 10, the connection being afforded, for example, through the medium of a ball and socket unit 24, the ball element 25 of which is carried by said radius rods at their meeting ends and the socket element 26 of which is adapted to be suitably anchored, as will be readily appreciated, to a conventional type of cross member, not shown. extending transversely of the frame 10 and constituting an element thereof.

In order to retain the axle 14 against displacement longitudinally of itself so that it will be maintained always in a perpendicular relation to the central vertical longitudinal plane $x-x$ of the frame 10, there is provided a thrust lever 27 disposed in a contiguous relation to said axle, one end of said lever being pivotally connected to said axle in any suitable manner, as at 28, and the opposite end of said lever being pivotally connected, in any suitable manner, to the lower end of an anchor post 30 suitably connected to and depending from the frame member 12.

The stabilizing unit 18 further includes a transversely disposed compression bar 31, which is suitably connected to the truss rods 21 and 22 at points intermediate their ends. As is apparent, the compression bar 31, is disposed in a parallel relation to the axle 14 and is located substantially midway between such axle and the ball and socket unit 24. It is to be noted that opposite ends of the compression bar 31 extend well beyond the respective radius rods 21 and 22 and terminate within or substantially within, planes A—A' and B—B' parallel to the central vertical plane of the frame 10 and passing respectively through the theoretical points of contact between the wheels 16 and the road surface. Disposed directly above the compression bar 31 and suitably connected to the side members 11 and 12 of the frame 10 is a transversely disposed abutment bar 32 which is of a length equal to that of said compression bar.

Suitably confined between the outer ends of the respective compression and abutment bars 31 and 32 are a pair of compression springs 34—35, the vertical axes of which are disposed respectively within, or substantially within, the parallel planes A—A' and B—B'.

From the foregoing construction it will be understood that in the event the wheels 16 simultaneously meet a road obstruction, the axle 14 will move upwardly about the transverse axis of the ball and socket unit 24 and in so doing will compress the springs 34 and 35, through the medium of which an upwardly directed force will be imparted to the frame 10 tending to lift it upwardly about the axis A'—B'. It will be understood that incident to any upwardly directed force that may be thus imparted to the frame 10, a counteracting downwardly directed force is imparted to such frame by way of the ball and socket unit 24, thus tending to maintain it in its normal plane of travel.

More specifically stated, if the front wheels simultaneously meet an elevation at A and B, the force is transmitted upward to the frame through the coil springs at D and E. (The "outrigger" beam shown paralleling the axle is rigidly integral with the radius rods and is the medium acting upon the springs.) This force tends to raise the vehicle on the axis at A'—B'. A counteracting downward force is applied at C through the ball and socket connection, tending to keep the vehicle level. A downward force is directed to the points D'—E' by the twisting action of the frame generated by the upward force at D—E and the downward force at C. The downward force at D'—E' causes a force to be delivered downward at the point C'. The downward force at C' is reflected in additional downward force at C, which additional force compensates for the difference in leverage between D—E and A'—B', and C and A'—B'.

In order to facilitate an understanding of the operation of the suspension, as when only one of the front wheels 16 meets an obstruction, it may be well to consider the triangle shown in Figure 2 as defined by the lines connecting the points A, B and C, the point C being regarded as the center of the ball and socket unit 24 through which the plane x—x passes and the points A and B being regarded, respectively, as the centers of the left and right front wheels 16—16 of the vehicle.

Taking into account the triangle just defined, let it be assumed that the left front wheel 16 meets an obstruction, thus causing the spring 34 to exert an upwardly directed thrust on the frame 10 by way of its included side member 12 at a point well beyond the limits of said triangle. At such time as the spring 34 is acting upwardly on the side member 12, such member is of course reacting downwardly on that spring, thus causing the spring 35, due to the fulcrum afforded between the two springs by reason of the presence of the compression bar 31, to act upwardly on the frame 10 by way of its included side member 11 at a point well beyond the limits of the triangle A, B, C, thereby imparting to said frame a downwardly directed force by way of the ball and socket unit 24 and thus tending to maintain the frame in its normal plane of travel.

Stated in other words, let it be assumed that when the left front wheel meets an elevation at A, an upward force is exerted through the coil spring at D to raise the vehicle on the axis B—B'. A counteracting downward force is exerted at C tending to depress the vehicle on a line running through C—C'. Because the points D and E are outside the triangle formed by connecting the points A, B, C, upward force is exerted upon the spring at E by the downward pressure at D acting on the axis A—C as indicated by the force lines D—1 and E—3, the line D—1 being a perpendicular from the axis A—C to spring 34, and the line E—3 being a perpendicular from the axis A—C to the spring 35. Because the point 3 is nearer C than it is 2, a greater portion of the downward pressure of the spring at E is exerted at the point C than at 2. (Similar to the forces induced by torsion bars when used in conjunction with individual suspension.) Thus, the differences of leverage of the points D and C against the axis B—B' is compensated for by the extra force applied downward at C and the force applied upward at E.

When the elevation at A is met, the downward pressure of the spring at E, acting outside the triangle A, B, C, and on the axis B—C, counteracts the upsprung weight of the suspension system as applied to A.

It is to be noted, in further considering the present invention, that when a vehicle equipped with the suspension herein shown is rounding, for example, a right hand curve, the spring mass of the vehicle tends to lean to the left, so that there is an inclination for it to assume a lowered position in the vicinity of the spring 34 and a corresponding elevated position in the vicinity of the spring 35. Such leaning or tilting of the vehicle is resisted according to the present invention because of the fact that the sprung mass of the vehicle is supported at relatively great distances from the longitudinal center line of the chassis as will be understood when taking into account the fact that the springs 34 and 35 which are disposed intermediate the compression and abutment bars 31 and 32, respectively, are located well beyond the limits of the triangle A, B, C.

Moreover, any tendency of the vehicle to tilt in the manner just mentioned will tend to compress the spring 34, thus inducing a downwardly directed force on the frame 10 by way of the ball and socket unit 24, thereby tending to maintain said frame in its normal plane of travel. Additionally, it is to be noted that any influence thus exerted on the spring 34 tending to compress it will likewise set up a tendency to compress the spring 35, thus augmenting the above mentioned force that is directed downwardly on the frame 10 by way of the ball and socket unit 24.

When rounding a curve in the direction described, the sprung portion of the vehicle tends to lean along the axis F—F', down at D and D' and up at E and E'. In addition to the suspension points at D, D', E' and E giving a wider platform for the frame, the pressure down at D and D' provides a pressure down at C and C' that restrains the upward tendency at those points. D and D', being outside the triangle ABC and A'B'C', cause partial spring compression at the points E and E'. Additional downward pressure is thus directed to the points C and C' further increasing the resistance to a rolling tendency along the axis F—F'.

When a load is placed on either the front or rear springing (as by suddenly stopping or starting, or because of the addition of unequalized weight) a downward force is applied at C or C', which causes the load to be distributed so that the lateral equilibrium is better maintained.

In view of the similarity existing between the stabilizing units 18 and 18', the former of which has been described in detail, it is believed sufficient to say in connection with the latter that its included radius rods 21' and 22' diverge rearwardly and are connected at their rear ends to the axle 15, which, like the axle 14, is held against undue displacement by a thrust lever 27', pivotally connected to the axle, as at 28', and in turn suitably connected to the lower end of an anchor post 30', which, like the anchor post 30, is connected to the side member 12 of the frame 10. The front or converging ends of the radius rods 21' and 22', where joined together, are connected, as by a ball and socket unit 24', to the frame 10 as described in connection with the ball and socket unit 24. It may be well to note that the central, vertical, longitudinal plane x—x of the frame 10 passes through the center C' of the ball and socket unit 24 and that such center may be regarded as the apex of a triangle formed by the lines connecting the points A', B', C', of which the points A' and B' may be considered, respectively, as the centers of the left and right rear wheels 17 of the vehicle.

The stabilizing unit 18' includes a transversely disposed compression bar 36 suitably connected to the radius rods 21', 22', and corresponding in every detail to the compression bar 31 except that it is provided at its opposite ends with a pair of right angle offset arms 37, adapted to accommodate a pair of shackles 38. These shackles 38 are connected to the outer ends of a transversely disposed leaf spring 40 of the semi-elliptical type, which is adapted to be suitably connected to the frame 10 through the medium of an appropriate cross-frame member, not shown. It will be understood, of course that the spring 40 functions as do the coil springs 34 and 35 and that its opposite ends are disposed at the same distance from the center line of the frame 10 as are these coil springs, all of the springs being thus so grouped as to afford widely separated points of support for the sprung weight of the vehicle.

As to the operation of the stabilizing unit 18', it is deemed unnecessary to discuss it further than to say that it functions in the manner already described in connection with the unit 18, the two units being employed collectively in a single vehicle and thus affording a complete suspension means as between the sprung weight of such vehicle and the front and rear axles thereof.

Although only one form of the invention is herein shown and described, it will be understood that various changes may be made without departing from the spirit of the invention or the scope of the following claims.

I claim:

1. In a vehicle having an axle and a frame, a spring suspension comprising a stabilizing unit including a pair of radius rods connected at their diverging ends to said axle and connected at their converging ends to said frame for universal movement with relation thereto, a compression bar secured to said unit at points midway of the ends of said radius rods and extending well beyond the same at opposite sides of said unit, spring means acting against said frame and reacting against said stabilizing unit by way of said compression bar, with the outer ends of which said spring means are associated, and a thrust lever connected at one end to said axle adjacent one of the said wheels and connected at the other end to said frame adjacent the other of said wheels.

2. In a vehicle having a frame in association with an axle equipped at its opposite ends with a pair of road wheels, a spring suspension comprising a stabilizing unit including a pair of radius rods connected at their diverging ends to said axle and forming therewith a triangle and connected at their converging ends to said frame for universal movement on the longitudinal center line of said frame, a compression bar secured to said unit at points intermediate the ends of said radius rods and extending well beyond the same at opposite sides of said triangle, the extreme ends of said bar being disposed substantially within vertical planes disposed in a paralled relation to said center line and passing through the center of said wheels, and spring means acting against said frame at points in vertical alignment with said extreme ends of said compression bar and reacting against said stabilizing unit by way of said compression bar, with said extreme ends of which said spring means are associated.

3. In a vehicle having a front and rear pair of axles with wheels on each end thereof and a frame, a spring suspension system comprising a pair of stabilizing units, each unit connected to the frame and one of said axles and including a pair of radius rods connected at their diverging ends to the axle and connected at their converging ends to said frame for universal movement with relation thereto, and spring means acting against said frame and reacting against said stabilizing unit at points outside of the triangle formed by the wheel centers and the connection of the radius rods to the frame, each of said points lying substantially in a longitudinal plane defined by the wheel centers on the front and rear axles.

JOHN B. WHITLOW.

REFERENCES CITED

The following references are of record in the file of this patent:

UNITED STATES PATENTS

| Number | Name | Date |
|---|---|---|
| 2,356,606 | Müller | Aug. 22, 1944 |

FOREIGN PATENTS

| Number | Country | Date |
|---|---|---|
| 590,056 | Great Britain | July 7, 1947 |